United States Patent [19]

Hanaki

[11] Patent Number: 4,571,469
[45] Date of Patent: Feb. 18, 1986

[54] ROTARY DIRECTION DETECTING SENSOR

[75] Inventor: Akira Hanaki, Aichi, Japan

[73] Assignee: Kabushiki Kaisha Tokai Rika Denki Seisakusho, Aichi, Japan

[21] Appl. No.: 631,154

[22] Filed: Jul. 18, 1984

[30] Foreign Application Priority Data

Jul. 20, 1983 [JP] Japan .................. 58-111398[U]

[51] Int. Cl.⁴ .................... H01H 3/16; H01H 9/00
[52] U.S. Cl. ........................ 200/61.54; 200/61.31; 200/61.35
[58] Field of Search ............ 200/61.27, 61.3, 61.31, 200/61.34, 61.35, 61.54

[56] References Cited

U.S. PATENT DOCUMENTS

| | | | |
|---|---|---|---|
| 2,043,158 | 6/1931 | Eatz | 200/61.31 |
| 2,103,287 | 12/1937 | Howard | 200/61.31 X |
| 2,147,630 | 2/1939 | Metcalf | 200/61.31 |
| 2,786,107 | 3/1957 | Grace | 200/61.27 X |
| 3,725,622 | 4/1973 | O'Keefe | 200/61.27 |
| 4,323,877 | 4/1982 | Morita et al. | 200/61.35 X |

Primary Examiner—J. R. Scott
Attorney, Agent, or Firm—Balogh, Osann, Kramer, Dvorak, Genova & Traub

[57] ABSTRACT

An improved rotary direction detecting sensor to be used for a vehicle. It includes a stationary member including a cylindrical extension, a movable member fitted on a rotor and rotatable in the same direction associated with the rotor, the rotor being rotatably fitted to the stationary member on its cylindrical extension, while the stationary member is kept unrotatable irrespective of the rotation of the rotor, and a follower member interposed between the stationary member and the movable member. The follower member has a cut-out engaged with a corresponding projection formed on the movable member to delay the rotation of the follower member for a predetermined angle with respect to the rotation of the movable member. Both the movable member and follower member are provided with separate connecting contacts, while the stationary member is provided with a group of contacts selectively contacted by the connecting contacts depending on the rotary direction of the rotor.

3 Claims, 12 Drawing Figures

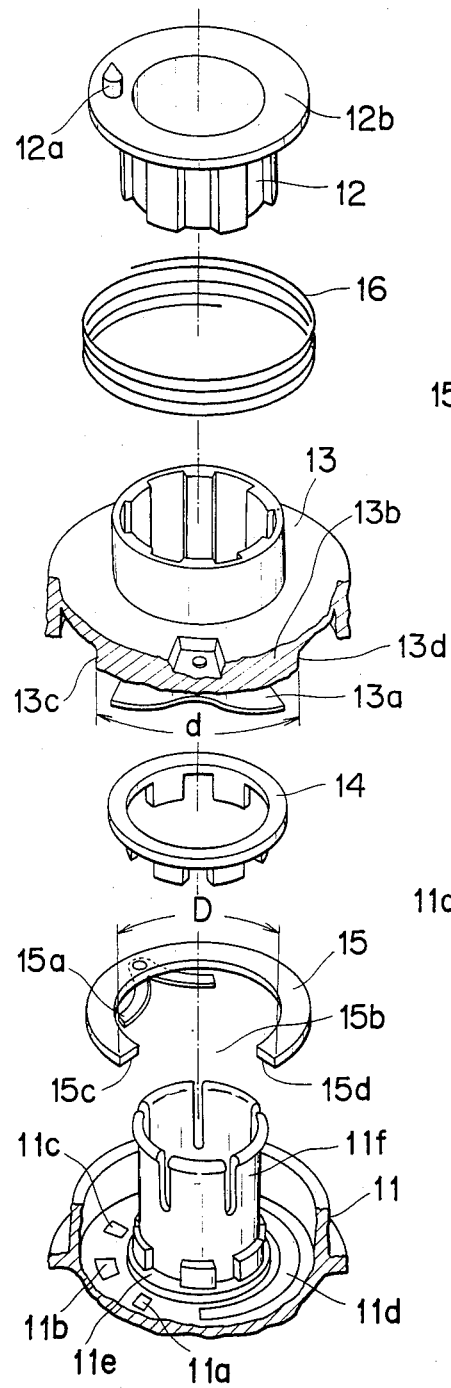
FIG. 5
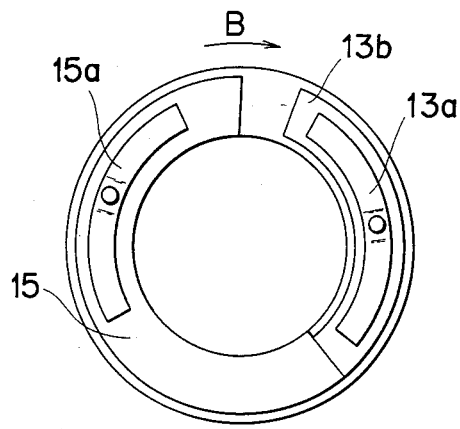
FIG. 8
FIG. 9
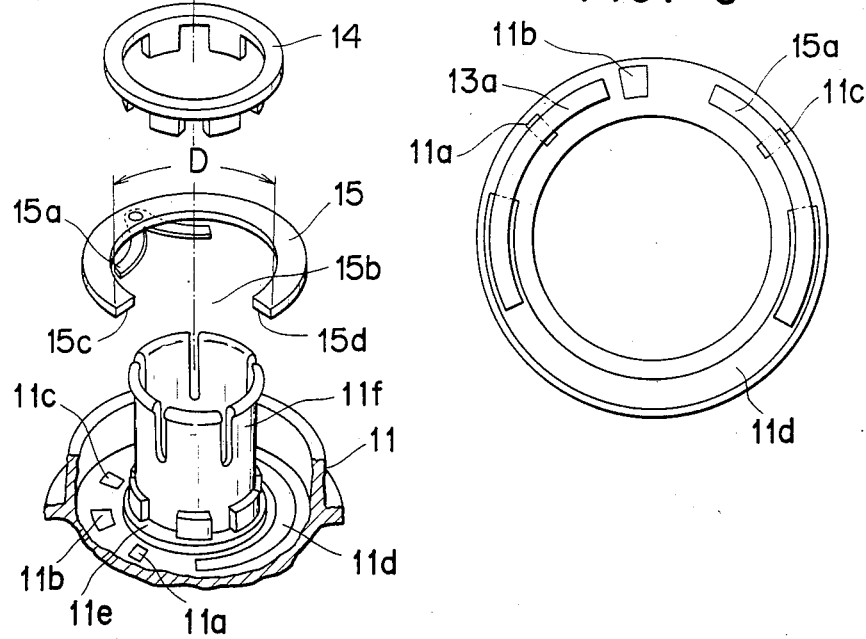

ROTARY DIRECTION DETECTING SENSOR

BACKGROUND OF THE INVENTION

This invention relates to an improvement in a rotary direction detecting sensor designed to detect the rotary direction of a steering wheel in order to stop the blinking of a turn indicator light of a vehicle.

In a vehicle nowadays, a switch for blinking a turn indicator light is often mounted in a place other than a steering column such as an instrument panel. In such case, when the steering wheel is returned to its original position after the turn is completed, a rotary direction detecting sensor is required in order to put off the turn indicator light by detecting the rotary direction.

One such rotary direction detecting sensor for serving this purpose is suggested in Japanese Utility Model Reg. Appln. Post-Examination Publication No. 56-172766 (1981).

The rotary direction detecting sensor of this type is shown in FIGS. 1 to 3, which will be now described hereunder with reference to the drawings.

In the drawings, steering wheel 2, steering shaft 2 and fixed member or stationary member 3 fixedly mounted on a steering column side and having a central cylindrical portion 3a, into which the steering shaft 2 is thrusted. A first rotor 4 is rotatably fitted on the central cylindrical portion 3a. The frist rotor 4 is provided with a collar 4b having a projection 4c which is inserted into a bore 1a defined in the steering wheel 1 in such a manner that the first rotor 4 is rotated in accordance with the rotation of the steering wheel 1.

A second rotor 5 having a cylindrical portion 5a and fitted on a cylindrical portion 4a of the first rotor 4 in such a manner as to be rotatable in association with the rotation of the second rotor 5 but being only slidable in the axial direction just the same as the relation between a key and a key groove. A third rotor 6 is rotatable in association with the rotor 5 in the same direction by means of a meshing engagement relative to each other. A semi-fixed member or semi-stationary member 7 is loosely fitted on a step portion 6a of the third rotor 6 and having a projection 7a inserted into a groove 3e of the stationary member 3, the semi-stationary member 7 contacting a projected ring 5d which is biased by a spring 8 stretched between the collar 4b and the second rotor 5.

When the steering wheel is rotated, the second rotor 5 is also rotated because of the mutual relation as mentioned above. Although the semi-stationary member 7 is also inclined to rotate due to the friction force relative to both the projected ring 5d and the step portion 6a of the third rotor, it stops rotating after being rotated for or at a predetermined angle since the projected portion 7a hits the end of the groove 3e.

The stationary member 3 is provided with two contacts 3b, 3c on its right and left portions at equal angles with respect to the groove 3e. The semi-stationary member 7 is provided with a contact 7b which is to be put in alignment with either the contact 3b or contact 3c depending on the rotary direction (when it is rotated for or at a predetermined angle as mentioned above,) while said second rotor 5 is provided with a bifurcated spring contact 5c for contacting said contacts 3b, 3c and the contact 7b.

Consequently, when the semi-stationary member 7 is rotated for or at a predetermined angle due to the rotation of the steering wheel, the spring contact 5c contacts with either of the contacts 3b and 7b, or 3c and 7b depending on its rotary direction so that the circuit is closed therebetween.

However, in this rotary direction detecting sensor, since the semi-stationary member is provided at the inner periphery of the stationary member having fixed contacts and this semi-stationary member and the second rotor 5 are provided with a contact respectively, 2 lanes are required only for contacts. In addition, the aforementioned structures are required. Therefore, the diameter of the sensor becomes very large.

Because of the above mentioned reasons, a rod-type horn contact could not be used. Furthermore, a leaf spring type contact which is now commonly used could not be used, because when employed, a problem is caused involving interference with the column cover.

SUMMARY OF THE INVENTION

The present invention was accomplished in order to overcome the above disadvantages.

It is therefore an object of the present invention to provide a rotary direction detecting sensor wherein the contacts are all provided on the same circumference so that the diameter thereof can be reduced.

Another object of the present invention is to provide a low priced rotary direction detecting sensor wherein the popular printed circuit board can be used as a contact or contacts since they are brought in contact with each other only on the same plane.

There is essentially provided a steering wheel rotary direction sensor including the following features:

a. A stationary member including a flange section and a cylindrical support section. The flange section has a first side and a second side. The cylindrical support section extends centrally from the first side of the flange section to support a steering shaft therethrough. The first side of the flange section carries a plurality of stationary contacts which are arranged thereon along a common circle.

b. A rotor member adapted to be rotated together with the steering wheel. The rotor member is concentrically provided around the cylindrical support section and being rotatable in first and second directions.

Furthermore, the rotor member has an arcuate extension projecting toward the first side to extend along the common circle, the arcuate extension carrying a first movable contact to selectively contact the plurality of stationary contacts which are arranged on the first side of the flange section.

c. A substantially circular follower member is concentrically provided around the cylindrical support section and having a cut-out portion to form a first end face and a second end face.

The first and second end faces face each other across a gap therebetween, the gap having a larger angular size than the arcuate extension. The arcuate extension extends between the first and second end faces of the follower member.

The follower member carries a second movable contact to selectively contact the plurality of stationary contacts on the first side of the stationary member.

d. The rotor member is adapted to actuate the substantially circular follower member in the first and second rotary directions, the first movable contact and second movable contact taking first and second angular positions during the actuation in the respective rotary directions.

e. The pluality of stationary contacts includes a common contact, and first, second, and third selective contacts. The first movable contact is selectively in contact with the second selective contact in the first angular position and with the first selective contact in the second angular position.

The second movable contact is selectively in contact with the second selective contact in the second angular position, and with the third selective contact in the first angular position.

The first and second movable contacts are in constant contact with the common contact.

BRIEF DESCRIPTION OF THE DRAWINGS

The novel features and advantages of the present invention will become more apparent from the following specification and claims when read together with the accompanying drawings wherein:

FIG. 5 is a perspective view partly cut out of FIG. 4;

FIGS. 7 and 8 are schematic views of the above showing how they operate;

FIG. 9 is a plan view of FIG. 4 schematically showing the relation among the stationary member, the second rotor and the follower member;

DETAILED DESCRIPTION OF THE EMBODIMENTS

Figure 1:
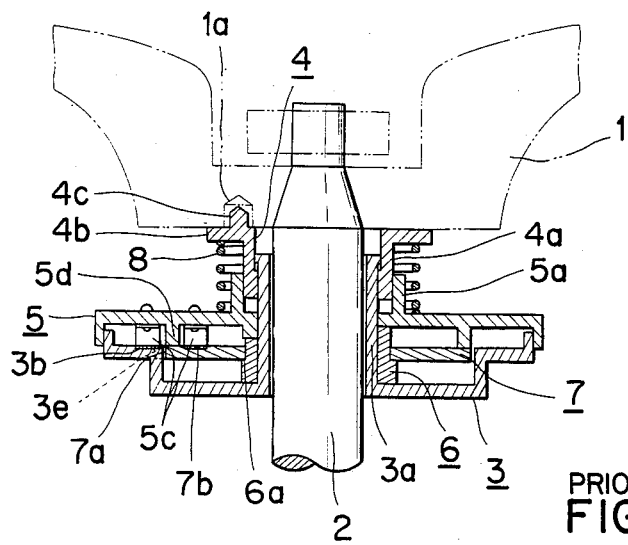
FIG. 1 is a sectional view of a conventional rotary direction detecting sensor.
Figure 2:
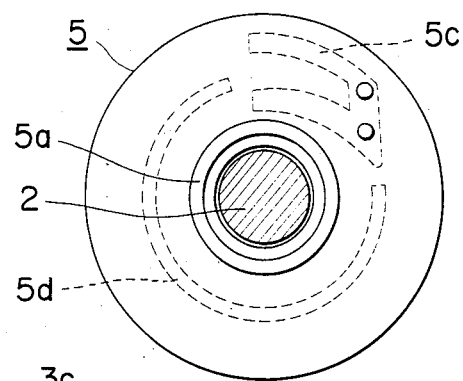
FIG. 2 is a plan view of a second rotor in FIG. 1.
Figure 3:
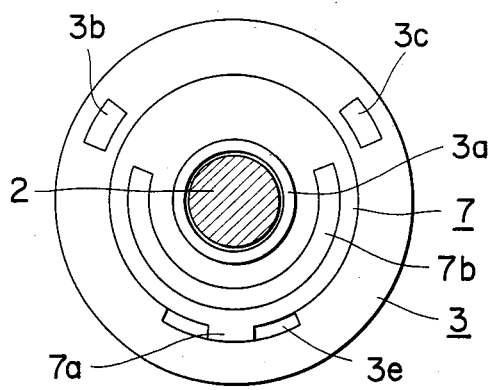
FIG. 3 is likewise a plan view of a stationary member and a semi-stationary member in FIG. 1.
Figure 4:
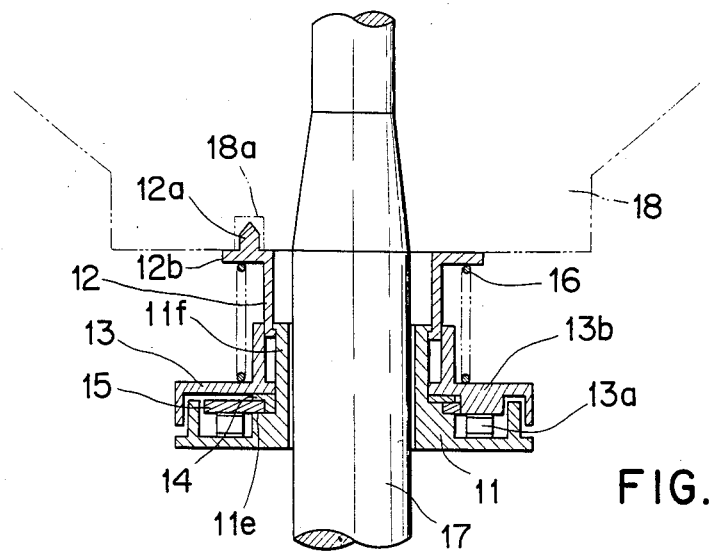
FIG. 4 is a vertical sectional view of a preferred embodiment of the present invention.
Figure 6:
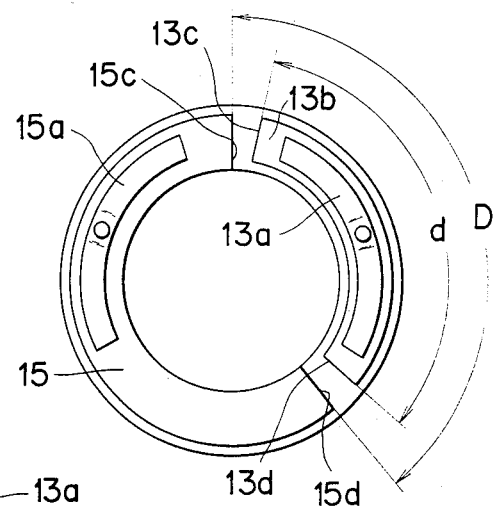
FIG. 6 is a plan view of a second rotor and a follower member of FIG. 4.

Preferred embodiments of the present invention will be described hereunder with reference to the accompanying drawings wherein like numerals denote like or corresponding parts throughout. A fixed member or stationary member 11 firmly fixed to a steering column of a vehicle, the central cylindrical support section 11*f* of said stationary member 11 receiving a steering shaft 17 thrusted therethrough. 12 denotes a first rotor fitted to said central cylindrical support section 11*f* and rotatable thereon. The first rotor 12 is formed with a collar portion 12*b* provided with a projection 12*a* which is fittingly received by a bore 18*a* defined in a steering wheel 18 in such a manner that the first rotor is rotated in association with the rotation of the steering wheel 18. A second rotor is fitted to the first rotor. Since the first rotor 12 and second rotor 13 are provided with groove and projection engagement members, they are rotatable in an associated fashion in the rotary direction of the rotor 12, but are slidable with respect to each other in the axial direction. A compression coil spring 16 is disposed between the collar portion 12*b* of the first rotor 12 and the second rotor 13 in order to bias the latter to the other direction of the steering wheel 18. A spacer 14 is fitted on the central cylindrical portion 11*f*. The spacer is unrotatable, since it is intimately meshed with the stationary member. A substantially circular follower member 15 is rotatably fitted on the spacer 14.

The follower member 15 is substantially circular but is provided with a cut-out 15*b* with a width of D angle which is engaged with an arcuate extension 13*b* with a width of smaller angle d compared with the angle D, the arcuate extension 13*b* projecting from the second rotor 13.

The follower member 15 and the arcuate extension 13*b* are provided with movable contacts 15*a* and 13*a* in the form of leaf springs; having contacting points on both legs thereof, respectively. The contacts 15*a* and 13*a* are firmly fixed to the follower member 15 and the arcuate extension 13*b* at the centers thereof, respectively. The arrangement is such that contacting points are brought to sliding contact with contacts 11*a*, 11*b*, 11*c*, and 11*d* formed on the stationary member 11 as will be described hereinafter.

With the above arrangement, when the second rotor 13 is rotated, although the follower member 15 is prevented from the rotating due to the frictional resistance against the leaf spring contact 15*a*, the surface of the stationary member 11 on which the contacts group are formed, the opposite face 11*e* of the stationary member 11, and the spacer 14, the follower member 15 is finally rotated delaying for a predetermined angle with respect to the second rotor 13, since the end face 15*c* of the cut-out 15*b* and the end face 13*c* of the arcuate extension 13*b*, or alternatively the end face 15*d* of the cut-out 15*b* and the end face 13*d* of the arcuate extension 13*b* are engaged and moved in associated fashion thereafter.

Figure 7:
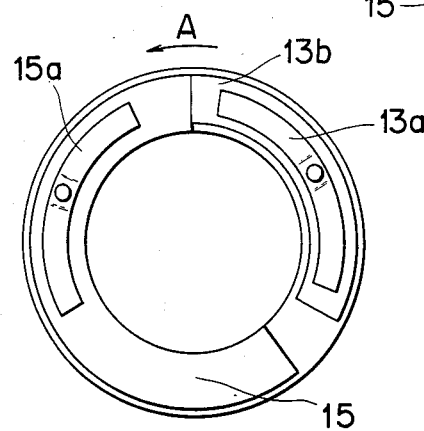
Figure 10:
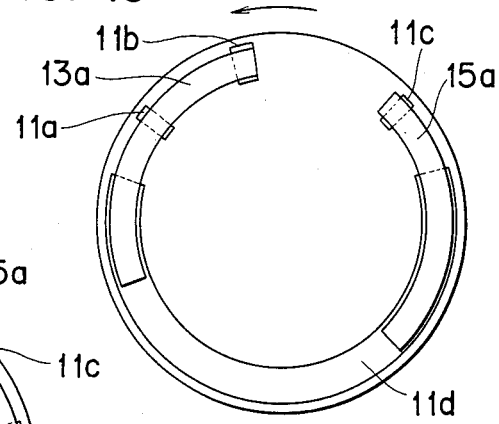
FIGS. 10 and 11 are schematic views of the above showing how they operate.

As shown in FIGS. 7 and 8, when the second rotor 13 is rotated in the direction as shown by an arrow A or B, the distance between the spring contacts 13*a* and 15*a* is varied depending on the rotary direction thereof. Therefore, when the second rotor 13 is rotated in the direction as shown by the arrow A, a circuit formed with the contact 11*a*—spring contact 13*a*—contact 11*d*—spring contact 15*a*—contact 11*b* is closed, but when the contact 11*c* is contacted by the spring contact 13*a* or 15*a*, the circuit to the contact 11*b* is never closed.

On the other hand, when the second rotor 13 is rotated in the direction as shown by the arrow B, a circuit formed with the contact 11*c*—spring contact 15*a*—contact 11*d*—spring contact 13*a*—contact 11*b* is closed, but when the contact 11*a* is contacted by the spring contact 13*a* or 15*a*, the circuit to the contact 11*b* is never closed.

Consequently, depending on which circuit is closed, i.e., the contact 11*b* and contact 11*a*, or the contact 11*b* and contact 11*c*, the rotary direction of the second rotor 13 can be detected. In other words, it is known whether the steering wheel is turned to the right or to the left.

Figure 12:
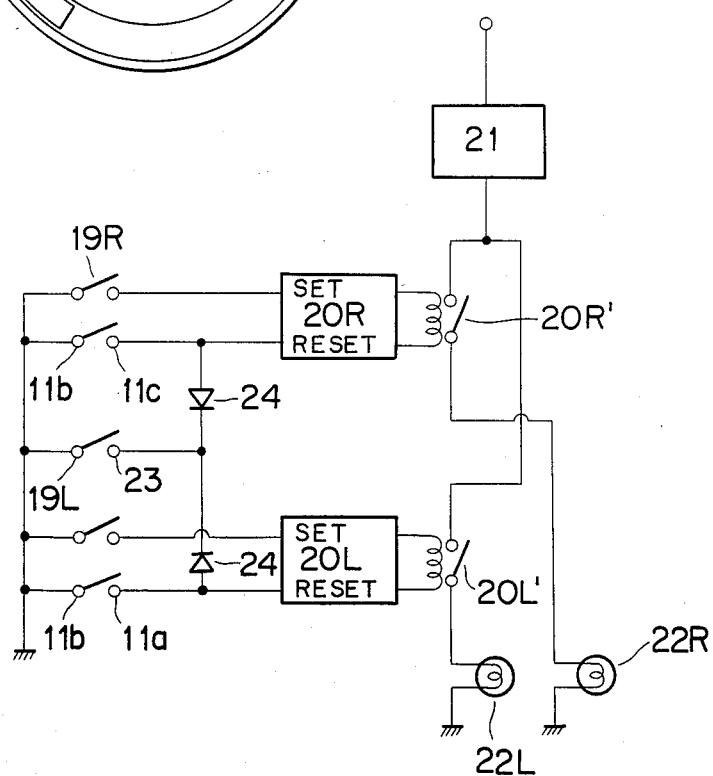
FIG. 12 illustrates a directional indicating circuit to which the sensor according to the present invention is applied.

Now, referring to FIG. 12, another explanatory embodiment of the present invention for putting off the blinking of the turn indicator light by returning the steering wheel to the original position after the turn is completed will be described.

Switches 19R and 19L are for right and left turn indicators. The latch circuits 20R and 20L are set to flow the current to internal relays 20R' and 20L' in order to close the contacts when the turn indicator switches 19R and 19L are closed. Turn indicators 22R and 22L are connected to the contacts of the relays 20R' and 20L'. A cancel switch 23 for resetting the latch circuits 20R and 20L through a diode 24 by means of manual operation.

When the turn indicator switch 19R is closed, the latch circuit 20R is set and the contact of said relay 20R' is closed. As a result, the right turn indicator light 22R is put on by means of the flasher unit 21. When the right turn indicator light 22R is required to put off, the cancel switch 23 is closed in order to bring the reset terminal of the latch circuit 20R to the earth electric potential through the diode 24. As a result, the latch circuit 20R is reset and the relay 20R' is brought to be in a non-operational state. As a result, the right turn indicator light 22R is put off.

Figure 11:
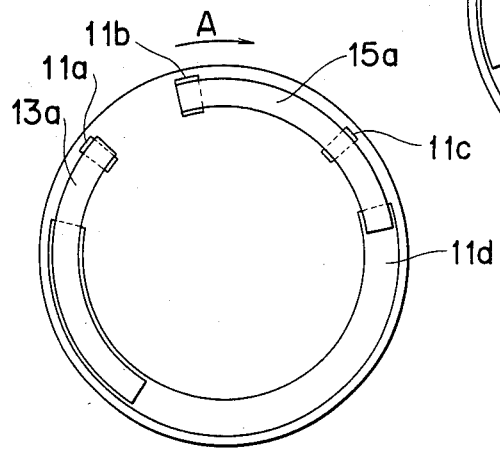

On the other hand, when the steering wheel is turned to the right direction in order to show that the vehicle is making a turn, by closing the right turn indicator light 19R, the follower member 15 is rotated in the right direction delaying for a predetermined angle to close the circuit from the contact 11a to the contact 11b, as shown in FIGS. 7 and 11. However, this closing of the circuit does not give any influence on the latch circuit 20R.

When the steering wheel is turned to the reversed direction after the right turn is completed, the follower member 15 is, as shown in FIGS. 8 and 11, rotated in the left direction delaying for a predetermined angle so that the circuit from the contacts 11b to 11c is closed. As a result, the reset terminal of the latch circuit 20R is brought to be an earth electric potential for resetting. As a result, the relay 20R' is brought to be non-operative and the right turn indicator light is put off.

Regarding the left turn, the left turn indicator light 22L is put on and put off in the same manner as described above with respect to the right turn.

As apparent from the foregoing description, according to the present invention, since a group of contacts provided on the same circumference are selectively contacted by the contacts formed on the movable member and the follower member due to the delaying of the rotation of the follower member for a predetermined angle relative to the movable member, and the circuits are selectively closed depending on the rotary direction due to the delaying of the rotation, the rotary direction of the movable member is readily detected by the closing of the contacts group.

Further, since the contacts group and the connecting contacts are all provided on the same circumference, the overall dimensions of the device can be reduced. Furthermore, since the contacts group are provided on the same circumference, these contacts group can be formed with a printed circuit board, thus achieving a low priced rotary direction detecting sensor by decreasing the manufacturing costs of the contacts.

What is claimed is:

1. A steering wheel rotary direction sensor comprising:
    a stationary member fixed to a steering column, said stationary member including a flange section and a cylindrical support section, said flange section having a first side and a second side, said cylindrical support section extending centrally from said first side of the flange section to support a steering shaft therethrough, said first side of the flange section carrying a plurality of stationary contacts arranged thereon along a common circle;
    a rotor member rotatable together with the steering wheel, said rotor member being concentrically provided around said cylindrical support section rotatably in first and second directions and having an arcuate extention projecting toward said first side t0 extend along said common circle, said arcuate extension carrying a first movable contact to selectively contact said plurality of stationary contacts; and
    a substantially circular follower member concentrically provided around said cylindrical support section, said substantially circular follower member having a cut-out portion to form a first end face and a second end face, said first and second end faces facing each other across a gap therebetween, said gap having a larger angular size than said arcuate extension, said substantially circular follower member carrying a second movable contact to selectively contact said plurality of stationary contacts on the first side of the stationary member, said arcuate extension extending between said first and second end faces of the substantially circular follower member;
    said rotor member actuating the substantially circular follower member in said first and second rotary directions, said first movable contact and second movable contact taking first and second angular positions during said actuation in said respective rotary directions, said plurality of stationary contacts including a common contact and first, second and third selective contacts, said first movable contact being selectively in contact with the second selective contact in said first angular position and with the first selective contact in said second angular position, said second movable contact being selectively in contact with the second selective contact in said second angular position and with the third selective contact in said first angular position, said first and second movable contacts being in constant contact with said common contact.

2. A steering wheel rotary direction sensor according to claim 1, wherein said common contact is of an elongated arcuate configuration and has a first end and a second end, said second selective contact being positioned between said first and second ends of said common contact, said first selective contact being positioned between said first end of the common contact and said second selective contact, said third selective contact being positioned between said second selective contact and said second end of the common contact.

3. A steering wheel rotary direction sensor according to claim 1, wherein said first and second movable contacts include respective leaf springs each having a pair of legs, each leaf spring having a size sufficient to straddle a selected member of the first and third selective contacts on said common contact and said second selective contact.

* * * * *